Inventor:
Gerhard Krause

Inventor:
Gerhard Krause

United States Patent Office 3,496,288
Patented Feb. 17, 1970

3,496,288

SYSTEM FOR COMPENSATING TIMING ERRORS IN A MONOCHROME TELEVISION SIGNAL

Gerhard Krause, Darmstadt, Germany, assignor to Fernseh GmbH, Darmstadt, Germany Filed Sept. 8, 1966, Ser. No. 578,437
Claims priority, application Germany, Sept. 11, 1965, F 47,173
Int. Cl. H04n 5/76
U.S. Cl. 178—6.6 3 Claims

ABSTRACT OF THE DISCLOSURE

An arrangement for compensating timing errors in a monochrome television signal. A first periodic signal is produced in phase with the line synchronizing pulse of the monochrome television signal, and with a frequency which is higher than the line frequency of the monochrome television signal. The periodic signal is then added to the monochrome television signal within the blanking interval. A second periodic signal is produced in phase with the pulse of a train of error-free line synchronizing pulses, and the monochrome television signal is delayed as a function of the time difference between the first and second periodic signal.

Figures 1, 2, 3:
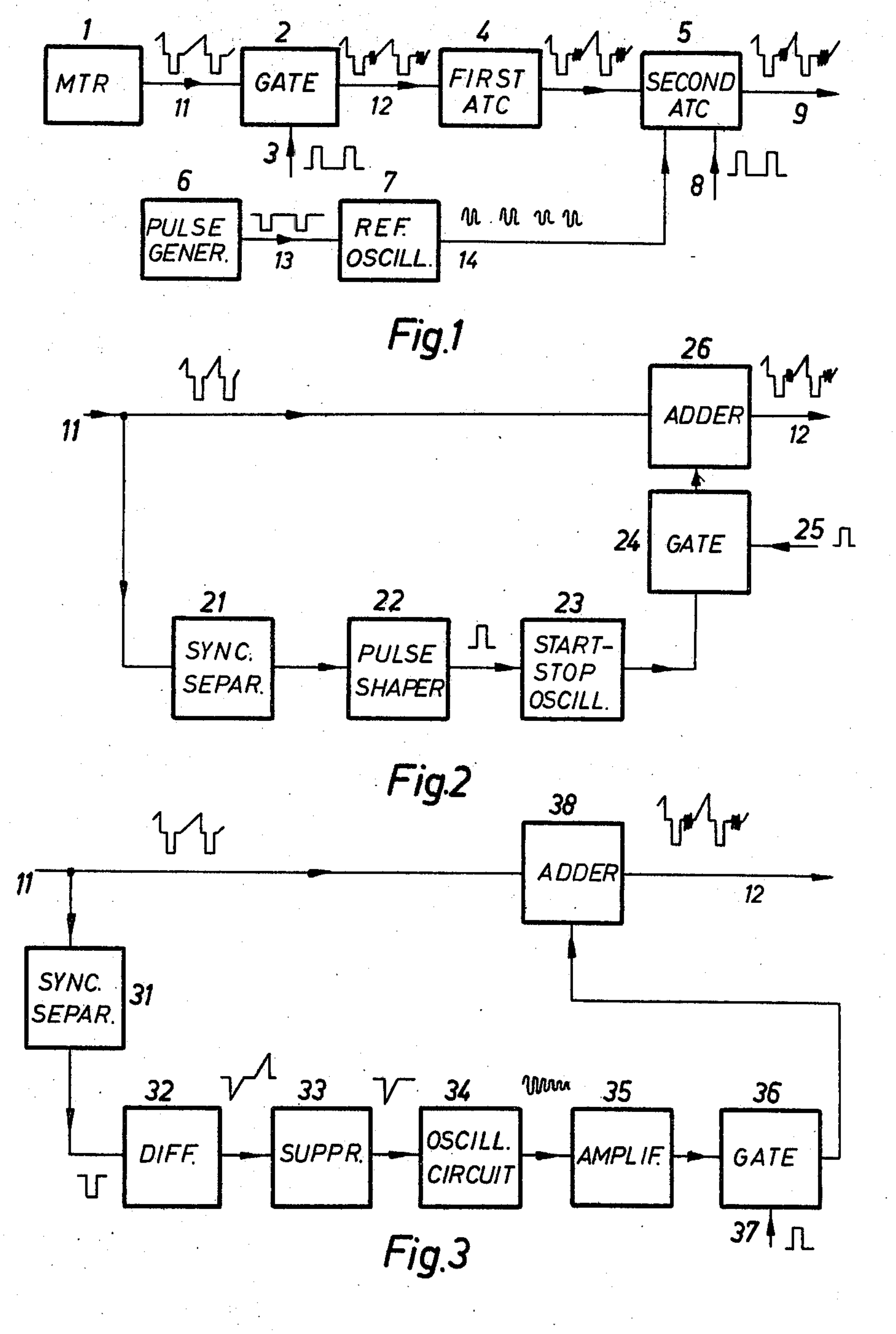

This invention relates to systems for compensating timing errors in a monochrome television signal, and particularly to systems for compensating timing errors in a signal reproduced from the movable storage medium of a television recorder.

It is already known, in television magnetic-tape recorders, to reduce or compensate for the timing error which is caused by the inevitable tolerances in the scanning speed and which cannot be eliminated by mechanical regulating devices, by varying the delay in the television signal picked up from the magnetic-tape recorder. For this purpose, the television signals playing back by the magnetic-tape recorder travel through a delay line with a variable delay. The delay is controlled by means of an error signal which is obtained by comparison between the timing of the synchronizing signal in the television signal and that of a constant-frequency synchronizing signal, e.g., supplied by a pulse generator.

A known device for the electrical compensation for timing errors contains a delay line, the delay of which is varied by controlling the capacitive or inductive networks by means of the error signal. Generally, the capacitances in the delay line are adapted for control by using as these capacitances semiconductor devices operated in the cut-off range.

The known device works in the manner of a open-loop control (forward-acting regulation) and would therefore theoretically be capable of causing a complete compensation for the timing error. In practice, however, a residual error remains because the tolerance limits in the controllable semiconductor devices and the device for deriving the strongly preemphasised control voltage cannot be kept sufficiently narrow. Even with the most careful construction, the residual error, with an input error of 1 microsecond cannot be kept less than about 30 nanoseconds.

Digital systems of compensating for the timing error have also been proposed wherein delay lines with an invariable delay connected in series, or a tapped delay line, are used and the signal is taken from that delay line or from that tap in the delay line at which the error is smallest. Even with this system, a residual error is unavoidable even with an error-free input signal, as a result of the discontinuous variation in the delay. This residual error is the smaller, the greater the number of steps or the number of taps selected in the delay lin. In a practical embodiment, with tolerable expenditure, there is a residual error of approximately the same order of magnitude as with the continuously controllable delay line, of about 30 nanoseconds, regardless of errors in the input signal.

It has been found that even an error of this order of magnitude leads to noticeable line displacement in the television picture, which cannot be permitted with high quality requirements such as are laid down in studio operation. Experiments have shown that the permissible error in timing should not be greater than 10 to 15 nanoseconds and so is substantially less than can be obtained with the known methods.

It is an object of the present invention to provide an improved system for establishing a high order of time base stability in a monochrome television signal.

Another object of the invention is to provide an improved reproducing system for a monochrome television signal recorded on the storage medium of a television recorder and capable of providing a fully satisfactory monochrome television signal for transmission.

Another object of the invention is to provide an improved system for connecting timing errors in a monochrome television signal reproduced from the movable storage medium of a television recorder.

Using the system according to the invention the timing errors in a monochrome television signal can be reduced to a sufficiently low value of a few nanoseconds with relatively small expenditure.

Figure 5:
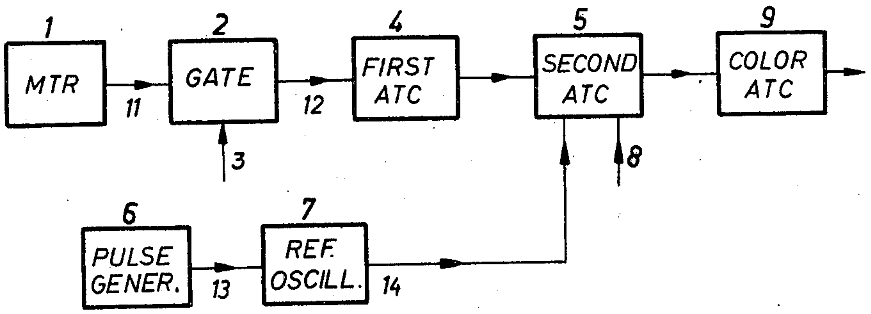
Figure 6:
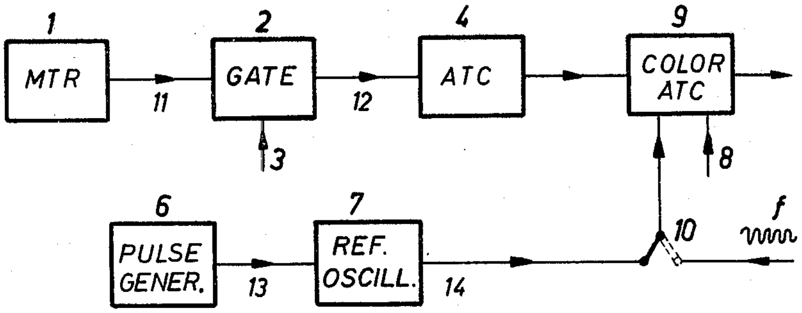
Figure 4:
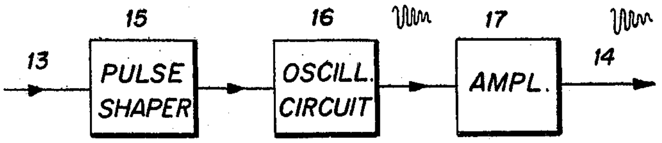

A better understanding of the invention may be had by reference to the following description, taken in conjunction with the accompanying drawings in which:

FIG. 1 is a block diagram of a magnetic television recording and reproducing system in accordance with the invention FIG. 2 shows schematically a device for producing a first periodic signal rigidly in phase with the line synchronizing pulses of the television signal in the system according to the invention FIG. 3 shows another device for producing a first periodic signal rigidly in phase with the line synchronizing pulses of the television signal FIG. 4 shows a device for producing a second periodic signal rigidly in phase with error-free line synchronizing pulses supplied by a pulse generator FIG. 5 is a block diagram of modified system in accordance with the invention FIG. 6 is a block diagram of a further modification of the system according to the invention.

In FIGURE 1, the monochrome television signal played back by a magnetic television recorder (MTR) 1, for example, and suffering from timing error, passes via the connection 11 to a device 2 in which a periodic signal is produced and superimposed on the monochrome television signal by means of a gating pulse supplied at 3, for example during the back porch of the blanking interval. The signal then passes via the connection 12 to a first automatic timing corrector (ATC) 4, which contains a delay line controlled in known manner in accordance to the phase difference between the line synchronizing pulses contained in the television signal and error-free line synchronizing pulses produced for example by a pulse generator. The timing error in the signal, originally 1 microsecond for example, is reduced to a value of for example 30 nanoseconds by the automatic timing corrector 4.

The signal with this lower maximum timing error then passes into a second automatic timing corrector 5. The automatic timing corrector 5 receives a reference oscillation which is rigidly in phase with an error-free synchronizing signal which is supplied, for example by a pulse generator 6. This signal passes from the pulse generator 6 via the lead 13 to a device 7 which produces the reference oscillation. A gating pulse is likewise supplied at 8 to the second automatic timing corrector 5. This gating pulse may be derived internally from the incoming television signal. The gating pulse has the effect that the second automatic timing corrector is only effective during the time when the superimposed oscillation is present in the television signal, for example only during the back porches. The television signal, which is now sufficiently free of error, is finally withdrawn at 9.

Since the second automatic timing corrector 5 which is connected after the first automatic timing corrector 4 only has to be effective within the tolerance range of the first automatic timing corrector 4, the cost of this second device 4 is not high.

If discontinuous automatic timing correctors in accordance with the first-mentioned proposal are used then the expenditure for both automatic timing correctors is considerably less than for the case where only one corrector is used, with sufficiently fine graduation.

FIGURE 2 shows an example of an embodiment of the device 2 in FIGURE 1. The synchronizing pulse is separated, in known manner by means of an sync separator (amplitude selector 21, from the television signal suffering from timing error and applied to the circuit at 11. The synchronizing signal then passes to a pulse shaper 22 which produces pulses with a high edge steepness, which are rigidly in phase with the line synchronizing pulse in the synchronizing signal and which control the commencement of oscillations in a start-stop oscillator 23. Before the arrival of the next line synchronizing pulse, the oscillation is stopped again in order to avoid disturbances, preferably even before the end of the line interval or before the beginning of the picture signal. For this purpose, for example, the pulse shaper 22 may be constructed in the form of a monostable multivibrator which delivers one pulse, the leading edge of which coincides with the line synchronizing pulse in the television signal and the pulse duration of which is selected in such a manner that the pulse is terminated within the line interval.

The train of oscillations produced by the start-stop oscillator 23 finally reach the gate 24 by which they are only allowed through, by means of a gating pulse applied at 25, in the required time interval, for example during the period of the back porch. Finally, the train of oscillations limited in time by the gate circuit 24 is added, in the adder 26, to the television signal coming from 11, and is superimposed, for example on its back porch.

In FIGURE 3, the synchronizing signal is likewise first separated in an sync. separator 31 from the television signal arriving at 11. The line synchronizing pulses are then differentiated in a differentiator 32. As a result, two narrow pulses of opposite polarity are obtained, originating from the leading edge and trailing edge respectively of the synchronizing pulse. One of these pulses, for example the pulse corresponding to the trailing edge, is suppressed in the suppressor 33, for example by means of a diode. The remaining narrow pulse, which accordingly corresponds for example to the leading edge of the synchronizing pulse, now excites an oscillatory circuit in the device 34 and causes it to oscillate at its natural frequency. The damping of the oscillatory circuit is selected in such a manner that, on the one hand the attenuation of the oscillation is not disturbing during the time of the back porch, but that on the other hand the oscillation has practically died away within one line period. The oscillatory circuit may be constructed with a crystal resonator in order to obtain adequate constancy of frequency. If the damping of the oscillatory circuit is too low, is of course also possible to stop the oscillations artificially in a suitable manner before the arrival of the next synchronizing pulse.

The train of oscillations produced by the oscillatory circuit, possibly after amplification in an amplifier 35, are again limited by means of a gate 36, to the required duration, for example to the duration of the back porch, by means of a gating pulse supplied at 37 to the gate, and are superimposed on the television signal, for example during the period of the back porch in the signal, in the adder 38.

The frequency of the periodic signal superimposed on the television signal is chosen so high that an adequate number of oscillations is available for the phase comparison with the reference oscillation for the production of the error signal during the time of the appearance on the oscillation, for example during the period of the back porch in the television signal. For this purpose, its frequency should be high in comparison with the line frequency and, in practice, it is generally selected at a few mc./s. It is of the order of magnitude of the frequency of the chrominance subcarrier in color television signals.

In magnetic television recorders for recording color television signals, which generally have an automatic timing corrector which limits the phase deviations in the chrominance subcarrier to the permissible value, there is the possibility of utilizing the system according to the invention during the recording of monochrome signals.

The device 7 for producing the reference oscillation may be similar to the device 2 in FIG. 1. The sync. separator 21 (FIG. 2) is missing however, since the line synchronizing pulse from the pulse generator 6 is already available to control the pulse shaper 22.

Since the synchronizing pulses supplied by the pulse generator 6 have a very high degree of accuracy in time, it is unnecessary to stop the oscillations produced in the device 7 (FIGURE 1). Instead of a start-stop oscillator, therefore, the device 7 may consist in known manner of an arrangement for producing harmonics from the train of synchronizing pulses or of a continuously oscillating oscillator, the frequency of which is adjusted in the manner of known flywheel circuit.

FIGURE 4 shows another example for the construction of the device 7 (FIG. 1) similar to the device shown in FIGURE 3. The error-free synchronizing pulses produced by the synchronizing pulse generator (6 in FIG. 1) coming via the lead 13 passes a pulse shaper 15. The pulses with a high edge steepness supplied by the pulse shaper 15 excites an oscillatory circuit in the device 16. The damped oscillations produced by the oscillatory circuit reaches after amplification in the amplifier 17 via the lead 14 the second automatic timing corrector 5 (FIG. 1).

This arrangement shown in FIGURE 5, which for the most part is identical with that of FIGURE 1, may however, include a third automatic timing corrector 9 for errors in color, which as shown in FIGURE 6 may be controlled by the chrominance subcarrier *f* during the processing of color television signals by appropriate actuation of a change-over switch 10. It is true that altogether three automatic timing correctors are then needed, connected in series. Nevertheless, when the intermittently working correctors for timing errors mentioned initially are used, the total expenditure is lower because each of the three compensators only has to have a small number of stages, the total of which is lower than the number of stages when two timing compensators are used.

In the diagrams shown in FIGURES 2 and 3, the gate 24, respectively 36, is not absolutely essential if the oscillations are interrupted already before the end of the blanking interval. The oscillations are then also superimposed on the synchronizing signal which is generally not disturbing. If the pulse shaper (22 in FIG. 2) delivers the gating pulse with delay, which can easily be achieved with known circuits, then this disadvantage is also eliminated.

While the invention has been illustrated and described as embodied in a magnetic television recorder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A system for compensating timing errors in a monochrome television signal reproduced from the movable storage medium of a television recorder, consisting of a television recorder containing means for separating the line synchronizing pulses from said reproduced monochrome television signal recorded on said movable storage medium, means for producing error-free line synchronizing pulses, means for producing a first periodic signal rigidly in phase with said separated line synchronizing pulses and having a higher frequency than the line frequency, means for adding said first periodic signal to said reproduced monochrome television signal within the blanking interval, a first automatic timing control device delaying said reproduced monochrome television signal according to the time difference between said separated line synchronizing pulses and said error-free line synchronizing pulses, means for producing a second periodic signal similar to said first periodic signal rigidly in phase with said error-free line synchronizing pulses, a second automatic timing control device delaying the monochrome television signal according to the phase difference between said first and said second periodic signal.

2. In a system according to claim 1, said periodic signals having the frequency of the color subcarrier of a color television signal.

3. In a system according to claim 2 switching means connecting said second automatic timing corrector with a source of a reference color subcarrier frequency instead with said means for producing said second periodic signal.

References Cited

UNITED STATES PATENTS

| | | | |
|---|---|---|---|
| 2,843,658 | 7/1958 | Christian. | |
| 3,012,208 | 12/1961 | Hassel | 331—173 |
| 3,141,926 | 7/1964 | Newell. | |
| 3,210,464 | 10/1965 | Felgel-Farnholz. | |
| 3,297,963 | 1/1967 | Halsted | 331—166 |

ROBERT L. GRIFFIN, Primary Examiner

H. W. BRITTON, Assistant Examiner

U.S. Cl. X.R.

178—69.5